Nov. 28, 1967  A. HAMMERSCHLAG  3,354,972
WEIGH SCALE WITH BEAM ACTING AS PISTON IN PNEUMATIC DAMPENER
Filed Oct. 10, 1966

INVENTOR
ALFRED HAMMERSCHLAG
BY
ATTORNEYS

United States Patent Office 3,354,972
Patented Nov. 28, 1967

3,354,972
WEIGH SCALE WITH BEAM ACTING AS PISTON IN PNEUMATIC DAMPENER
Alfred Hammerschlag, Delft, Netherlands, assignor to Fijn Mechanische Industrie "Becker's Sons" N.V., The Hague, Netherlands, a company of Netherlands
Filed Oct. 10, 1966, Ser. No. 585,642
Claims priority, application Netherlands, Oct. 14, 1965, 65—13,288
5 Claims. (Cl. 177—188)

The invention relates to balance weighing devices for weighing articles.

Weighing devices of this kind are usually provided with means for damping the oscillating movement of the movable balance parts in order to shorten the oscillation period of the device during weighing. Such damping usually is derived from the friction between a movable part of the balance and a fluid and from the internal friction of the fluid displaced by such movable part. For sensitive balances, air is preferred as damping fluid since the use of liquids as damping fluids introduces spurious effects, the influence of which on the read-out accuracy may be of the same order of magnitude as the weight to be determined or even exceed this weight. As air has only a very small amount of internal friction and in order to obtain a damping effect of sufficient strength, generally relatively large air dampers are used, located at relatively great distances from the balance pivot so as to be displaced over a relatively great distance when the balance beam is pivoted over a relatively small angle and to thereby exert a relatively large resisting couple on the beam.

It is an object of the invention to provide a novel balance weighing device of the air damped type, which does away with the need to use such a cumbersome damping mechanism.

It is another object of the invention to provide a balance weighing device of compact damping construction and having a good resistance to outside air pressure variations.

These objects are achieved, according to the invention, by the provision of a balance weighing device comprising a box-shaped support, a bi-armed balance beam, bearing means, said beam being pivotally supported in said support by said bearing means, an air filled chamber within said support, a substantially vertical partition dividing said chamber into two compartments, said partition providing narrow passages operatively interconnecting said compartments, the arms of said beam extending oppositely of each other on different sides of said partition and forming, in said chamber, pistonwise movable wall parts of said compartments, respectively, so as to constitute, together with said air filled compartments, said partition and said passages, damping means for said beam.

This may be realised, according to the invention, in a weighing device of this type, in which said bearing means comprise a knife-edge attached to said beam and a seat attached to said support, said seat being located between said chambers and constituting, together with said knife-edge, at least part of said partition between said two compartments.

In order to facilitate a good control of the damping of the balance, the invention furthermore prescribes that the wall of at least one of said compartments be provided with an aperture having a controllable passage area, said aperture operatively connecting said compartment with the air outside said compartment, which may be realized in a very simple way when such an aperture of controllable passage area is provided in the partition, in which case the aperture preferably interconnects the two compartments.

Finally, in order to render the balance equilibrium independent of air draughts from the outside, the invention prescribes that the areas of the horizontal projections of said arms be substantially equal in the equilibrium position of said beam.

These objects and advantages of the present invention will become apparent from the following description of a preferred embodiment which is illustrated in the accompanying drawing, wherein.

Figure 1:
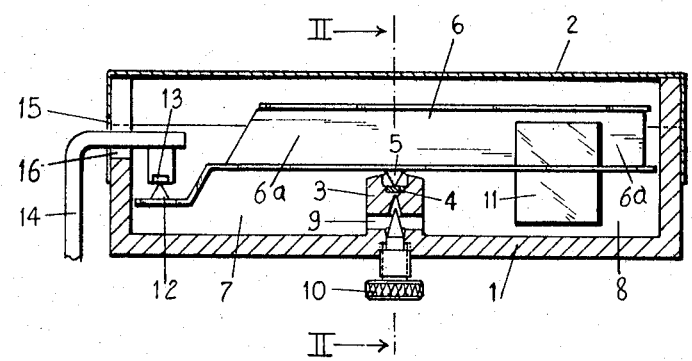
FIGURE 1 is a longitudinal section through the upper part of a balance.
Figure 2:
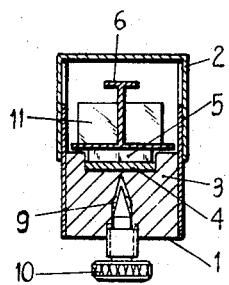
FIGURE 2 is a cross sectional view along the lines II—II of FIGURE 1.

As will be seen in FIGURE 1, only the upper part of the balance here described is shown. A base part for stationing the balance on a bench or table as well as article carrying means like a pan carried by the partly shown stirrup 14 have been omitted from the drawing since the invention is not concerned with these and other parts.

As is shown in FIGURE 1, a support 1 is closed at its bottom and sides and carries a dust cap 2 at its top. At its elevated middle part 3, the support carries a main knife-edge seat 4 which constitutes, together with a main knife-edge 5 attached to the balance beam 6, a pivotal knife-edge lay-up or bearing for the beam 6.

The middle part 3 of the support bottom, main seat 4 and knife-edge 5 constitute together a vertical partition between the two damping compartments 7 and 8, respectively, which are enclosed, at their bottoms and sides, by parts of the support 1. The compartments 7 and 8, furthermore, are covered, respectively, at their tops by the beam parts or arms 6a, respectively, extending from the knife-edge bearing 4, 5. Between the vertical sides of the support 1, the two beam arms 6a close the two compartments 7 and 8 at their tops, respectively, in such manner as to leave escape apertures or slits of only limited passage area. In the same way, the apertures or chinks left in the partition formed by the middle support part 3 and the knife-edge bearing 4, 5 are very narrow.

In the middle part 3 of the support 1 and beneath the main knife-edge seat 4, a connection channel 9 is provided, the passage area of which may be adjusted by means of an adjustment screw 10. The channel 9 interconnects the campartments 7 and 8 for passage of air therebetween.

The beam 6 carries, near its one end, a counterweight 11 and, at its other end, a knife-edge 12 bearing a seat 13 attached to the horizontally bent top end of the stirrup lever 14. Stirrup lever 14 can freely move within an aperture 15 provided, above beam 6, in the dust cap 2 and within an aperture 16, provided, also above beam 6, in the support 1.

Beam 6 is profiled in such manner as to present to pressure variations entering into the space enclosed by the dust cap 2 and the support 1 through the afore-mentioned apertures 15 and 16 equal engagement areas on both sides of knife-edge bearing 4, 5, so that such pressure variations do not influence the beam 6 once it has reached its equilibrium position.

As will be clear from the drawing, air displacements within the device take place only through connection channel 9 throttled by adjustment screw 10 and through the narrow slits and chinks between the compartment walls and the beam 6, which causes a considerable amount of internal air friction. This notwithstanding the fact that a compact construction of the air damping means has been obtained.

What is claimed is:

1. A balance weighing device comprising a box-shaped support, a bi-armed balance beam, bearing means, said beam being pivotally supported in said support by said bearing means, an air filled chamber within said support, a substantially vertical partition dividing said chamber into two compartments, said partition providing narrow passages operatively interconnecting said compartments, the arms of said beam extending oppositely of each other on different sides of said partition and forming, in said chamber, pistonwise movable wall parts of said compartments, respectively, so as to constitute, together with said air filled compartments, said partition and said passages, damping means for said beam.

2. A weighing device according to claim 1, in which said bearing means comprise a knife-edge attached to said beam and a seat attached to said support, said seat being located between said chambers and constituting, together with said knife-edge, at least part of said partition between said two compartments.

3. A weighing device according to claim 1, in which the wall of at least one of said compartments is provided with an aperture having a controllable passage area, said aperture operatively connecting said compartment with the air outside said compartment.

4. A weighing device according to claim 1, in which said partition is provided with an aperture of controllable passage area, said aperture operatively interconnecting said two compartments.

5. A weighing device according to claim 1, in which the areas of the horizontal projections of said arms are substantially equal in the equilibrium position of said beam.

References Cited

UNITED STATES PATENTS 1,211,881   1/1917   Rushton _____ 177—188 X

ROBERT S. WARD, Jr., *Primary Examiner.*